United States Patent
Iwai et al.

(10) Patent No.: US 6,516,912 B2
(45) Date of Patent: Feb. 11, 2003

(54) POWER TRANSMISSION MECHANISM FOR A MOTORCYCLE

(75) Inventors: Toshiyuki Iwai, Saitama (JP); Shinji Ito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,492

(22) Filed: Feb. 23, 2001

(65) Prior Publication Data

US 2001/0020555 A1 Sep. 13, 2001

(30) Foreign Application Priority Data

Feb. 25, 2000  (JP) ........................................ 2000-048459

(51) Int. Cl.[7] .............................................. B62D 61/02
(52) U.S. Cl. ....................... 180/226; 180/219; 180/385; 464/73; 464/81
(58) Field of Search ................................ 180/226, 227, 180/219, 231, 385; 301/6.1, 6.9; 474/94, 902, 903; 464/73, 74, 76, 81

(56) References Cited

U.S. PATENT DOCUMENTS

| | | | | |
|---|---|---|---|---|
| 1,790,614 A | * | 1/1931 | Liepert | 180/385 |
| 3,636,729 A | * | 1/1972 | Patel | 464/73 |
| 3,747,720 A | * | 7/1973 | Jensen | 464/76 |
| 4,328,879 A | * | 5/1982 | Tone | 180/219 |
| 4,436,173 A | * | 3/1984 | Takahashi | 180/226 |
| 4,794,998 A | * | 1/1989 | Iwai et al. | 180/219 |

FOREIGN PATENT DOCUMENTS

| | | | | |
|---|---|---|---|---|
| AT | 179720 | * | 2/1954 | 180/226 |
| GB | 2158195 | * | 11/1985 | 464/73 |
| JP | 58116887 | | 8/1983 | |
| JP | 544599 | | 11/1993 | |

* cited by examiner

*Primary Examiner*—Daniel G. DePumpo
(74) *Attorney, Agent, or Firm*—Birch, Stewart, Kolasch & Birch, LLP

(57) ABSTRACT

To provide a power transmission mechanism into which a driven flange is assembled, the power transmission mechanism producing no metal contact noises. A driven flange is divided into an engine side flange and a wheel side flange. The engine side flange may be formed of a steel forging and the wheel side flange may be formed of an aluminum forging. The engine side flange is spline-fitted in a final gear integrally rotated with a bevel gear. Furthermore, openings are formed in the wheel side flange at equal intervals and blocks having a threaded hole therein are pressed into the openings. In addition, the engine side flange, the wheel side flange, and the blocks are integrally connected together with bolts.

16 Claims, 7 Drawing Sheets

POWER TRANSMISSION MECHANISM FOR A MOTORCYCLE

BACKGROUND OF THE INVENTION

1. Field of the Invention

The present invention relates to a power transmission mechanism for a motorcycle. In particular, the present invention relates to a mechanism in which an elastic member is interposed between a driven flange and a wheel.

2. Description of Background Art

In a power transmission mechanism for a shaft driving system, if rapid variations in the rotation of a driving shaft or a wheel are transmitted to each other, riding comfort is impaired. To overcome this deterioration in riding comfort, a mechanism in which an elastic member is disposed between a driven flange rotated by a driving shaft and a wheel is disclosed in Japanese Examined Utility Model Publication No. 5-44599 or Japanese Unexamined Utility Model Publication No. 58-116887.

Referring to FIGS. 6 and 7 of the present invention, the above-mentioned conventional mechanism of the above documents will be described. A recess 102 is shaped like a fan when viewed from the side. The recess 102 is formed in a wheel 101 which is rotatably mounted on a rear axle 100. A damper rubber 103 is fitted in the recess 102. Furthermore, a metal collar 104 is fitted in the center of the damper rubber 103.

In addition, a driven flange 106 is spline-fitted in a final gear 105 to which power is transmitted from an engine and a pin 107 which is fixed in the driven flange 106 is inserted into the metal collar 104. Accordingly, the rotation of the driven flange 106 is transmitted to the wheel 101 via the damper rubber 103.

In the above-mentioned conventional mechanism, clearance must be provided between the pin 107 and the metal collar 104 in order to insert the pin 107 into the metal collar 104. Furthermore, since the driven flange 106 is freely movable in the direction of the rear axle 100, the driven flange 106 tends to move in the direction shown by an arrow in FIG. 6 when it is rotated. Therefore, in the conventional mechanism, there is a possibility that the pin 107 comes into contact with the metal collar 104. Accordingly, undesirable wear and sound is produced.

SUMMARY OF THE INVENTION

In order to solve the above problem, the present invention provides a power transmission mechanism for a motorcycle in which an elastic member is fitted in a recess formed in a wheel and a driven flange is connected to the elastic member to transmit power from an engine to the wheel via the elastic members, wherein the driven flange is divided into an engine side flange formed of a highly rigid material such as steel and a wheel side flange formed of a light material such as aluminum, and wherein the engine side flange is integrally connected to the wheel side flange with a fastening member.

While elastic members are provided with metal collars and driven flange side pins are inserted into the collars in a conventional power transmission mechanism for a motorcycle, in the power transmission mechanism in accordance with the present invention, the elastic members are not provided with metal collars and hence the pins do not contact the metal collars as is the case with the conventional power transmission mechanism.

A power transmission mechanism for a motorcycle in accordance with the present invention is suitable for a power transmission mechanism employing a driving shaft. In this case, power from the engine is transmitted to a final gear via a driving shaft and bevel gears and the above engine side flange is spline-fitted in the final gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
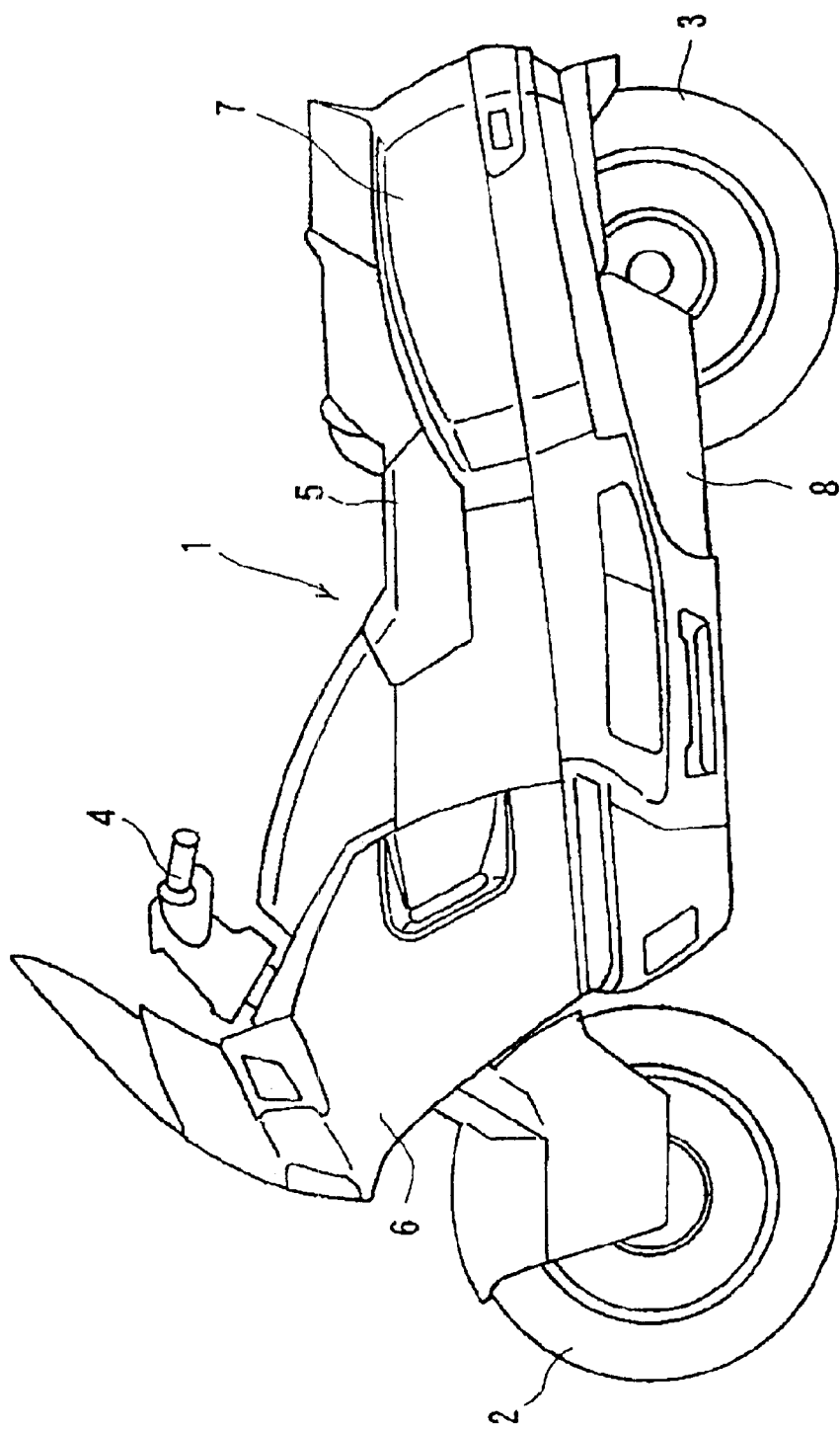
FIG. 1 is a side view of a motorcycle employing a power transmission mechanism in accordance with the present invention.
Figure 2:
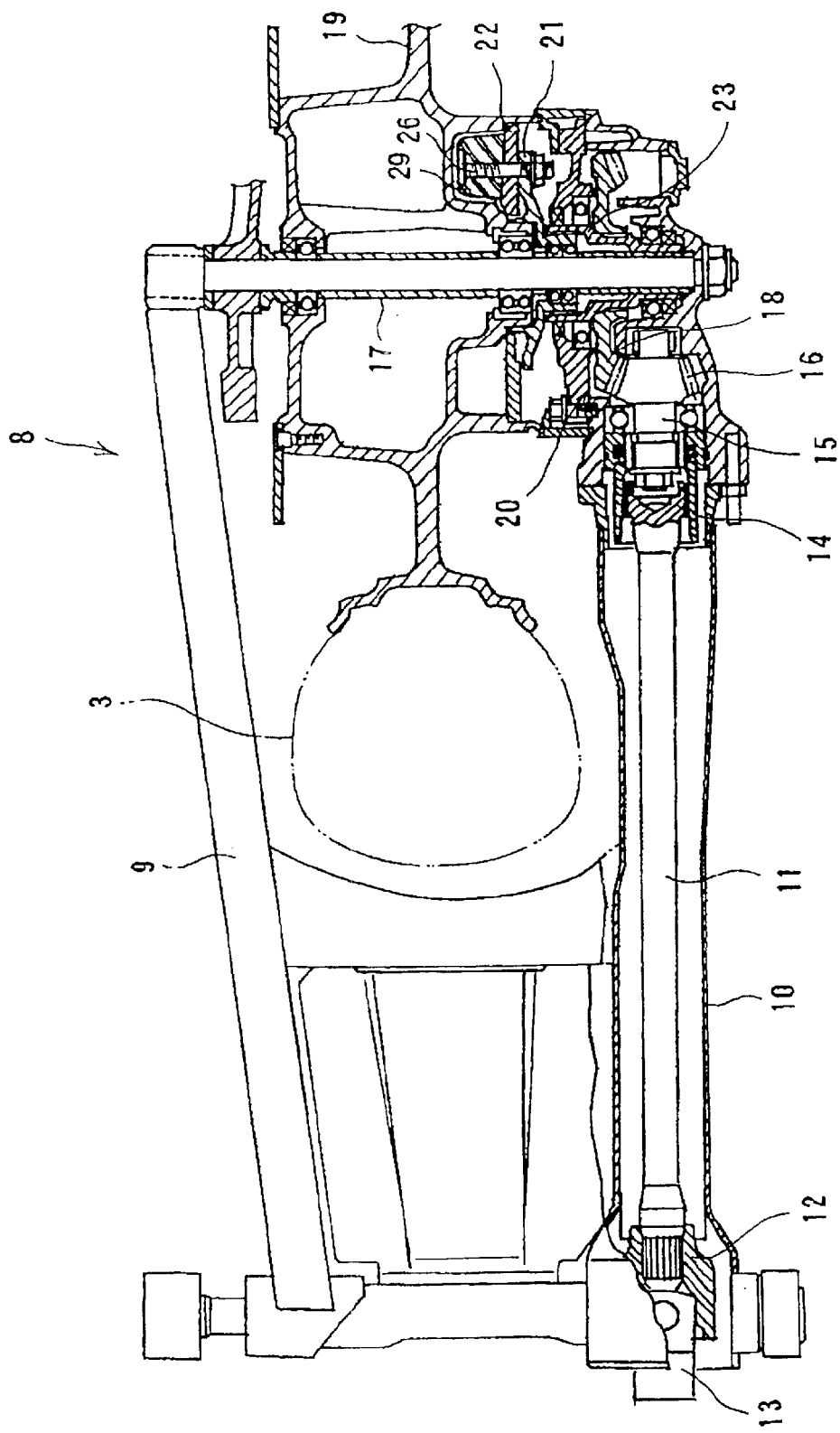
FIG. 2 is a plan view, partially in cross section, of a power transmission mechanism in accordance with the present invention.
Figure 3:
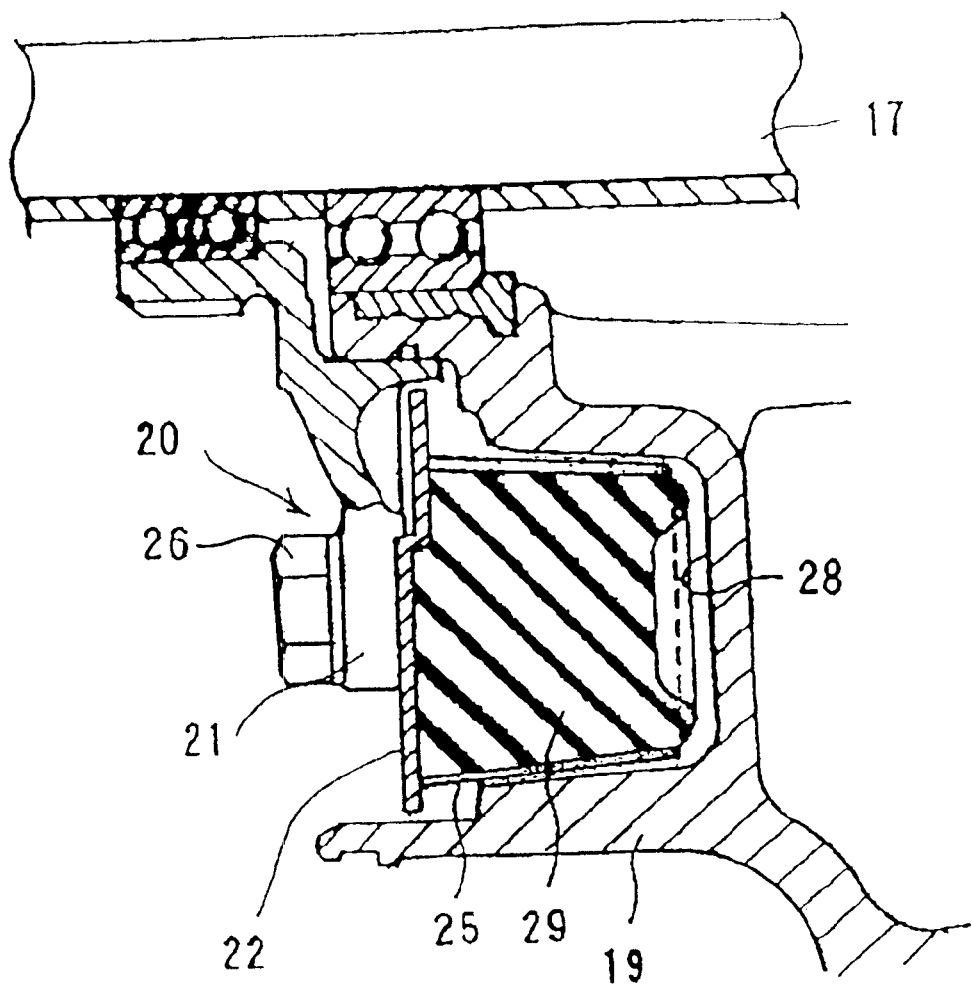
FIG. 3 is an enlarged cross-sectional view of an essential part of a power transmission mechanism in accordance with the present invention.
Figure 4:
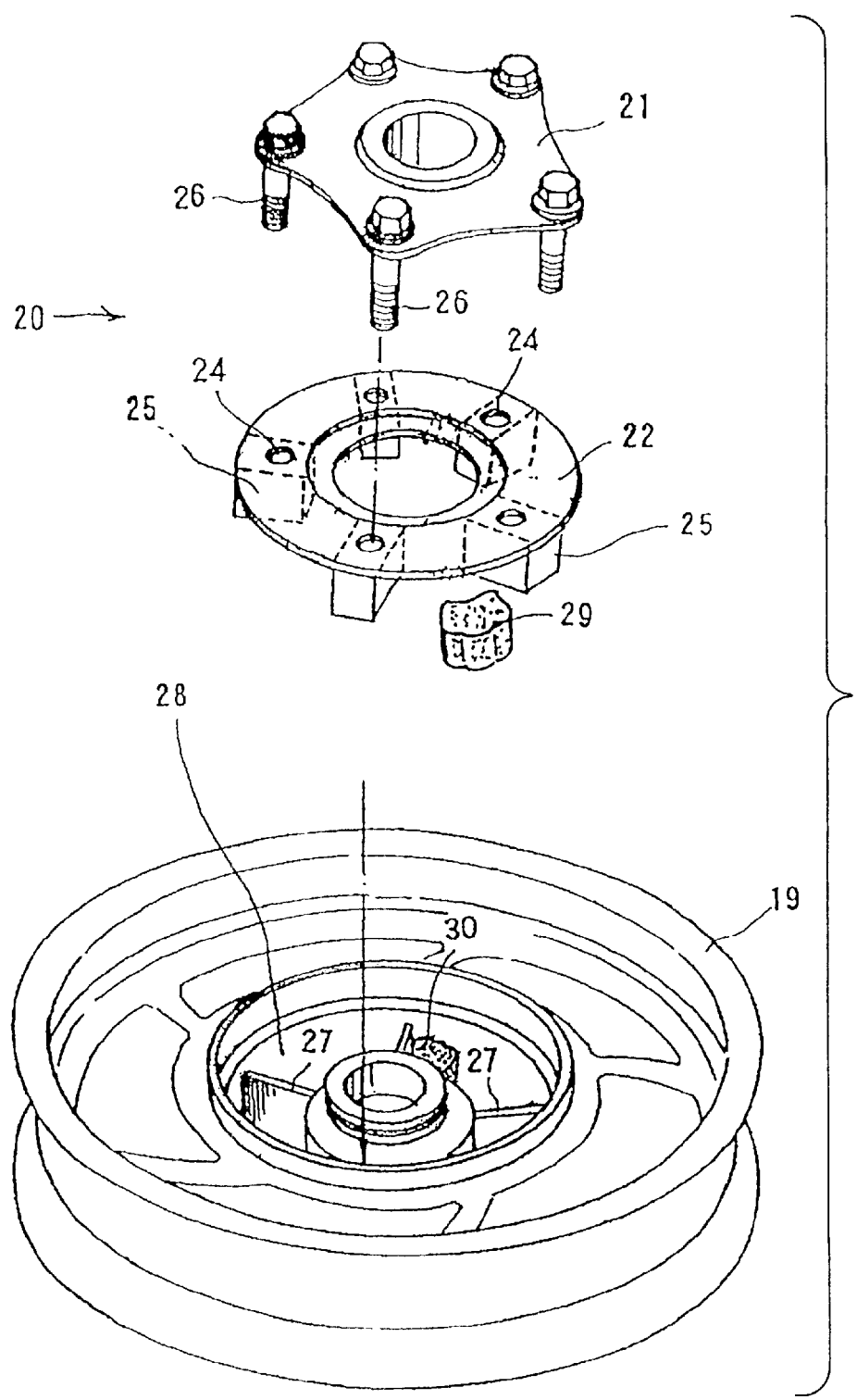
FIG. 4 is an exploded perspective view of an essential part of a power transmission mechanism in accordance with the present invention.
Figure 5:
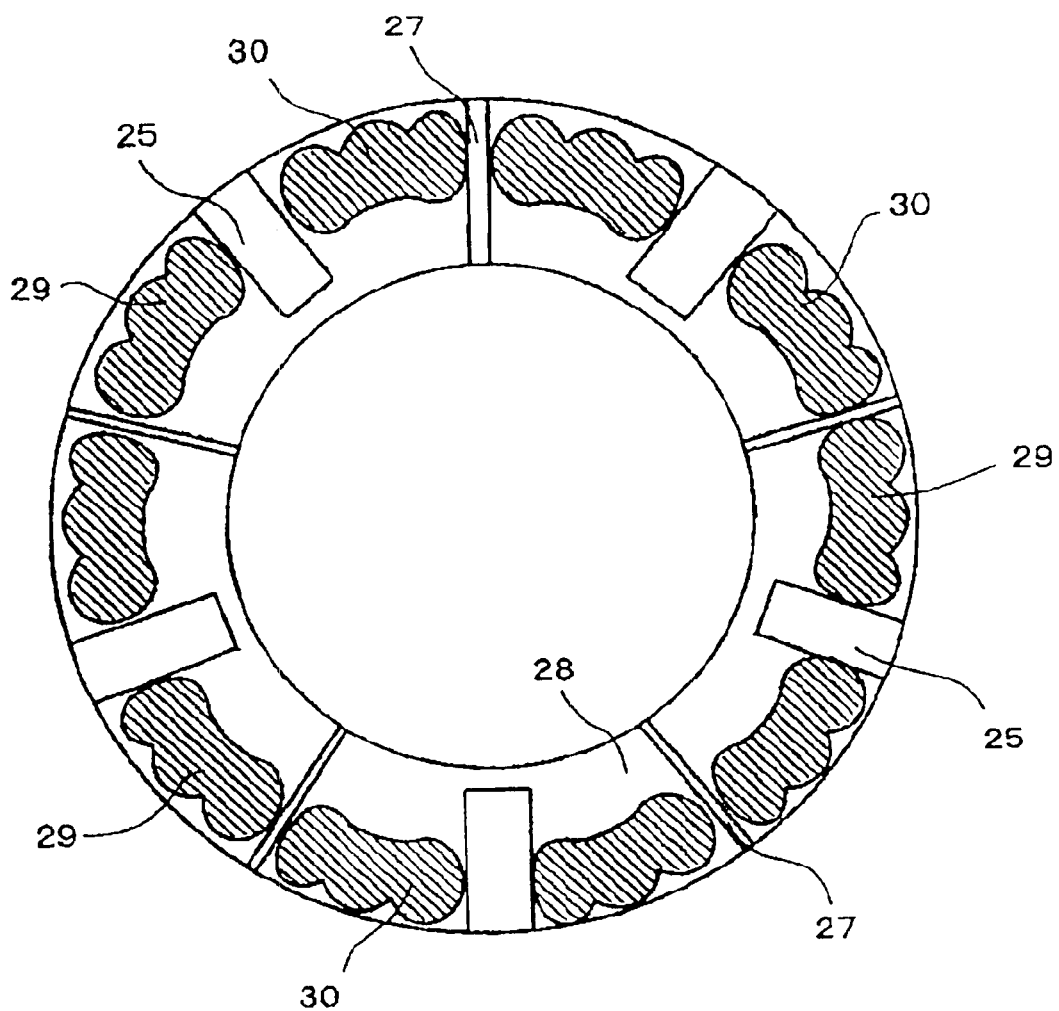
FIG. 5 is an illustration showing a relationship among a block for a wheel side flange, a wheel side receiving plate, and an elastic member.
Figure 6:
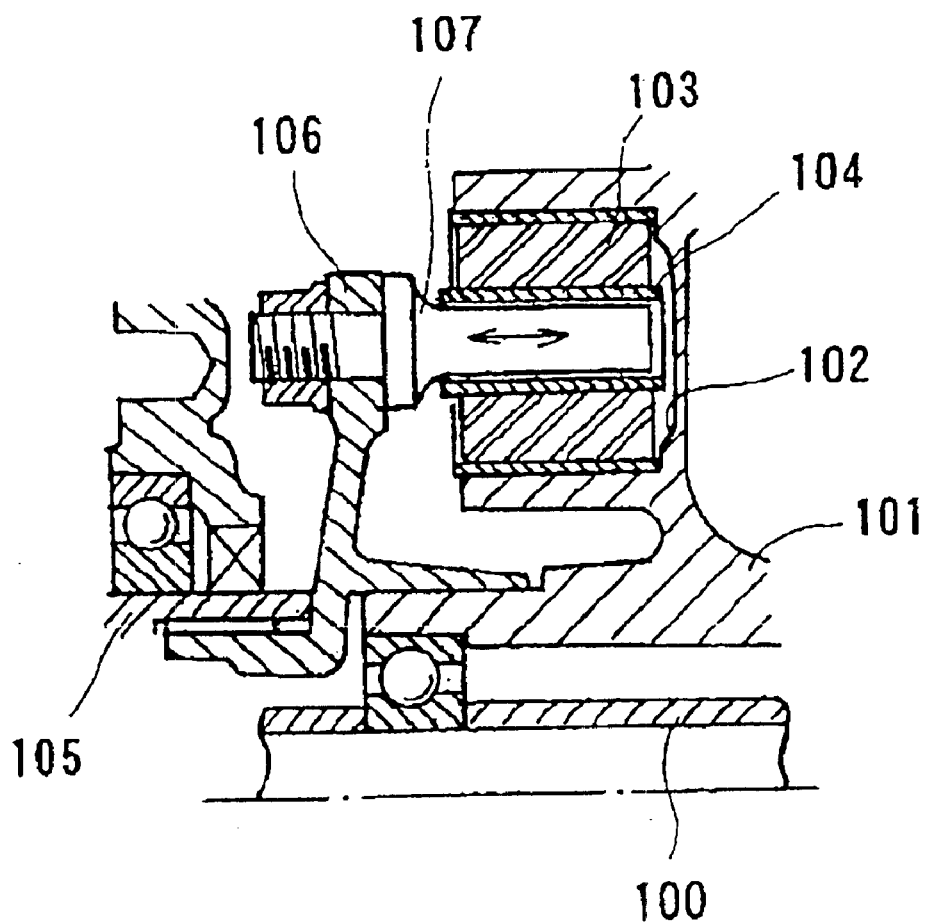
FIG. 6 is a cross-sectional view of an essential part of a conventional power transmission mechanism.
Figure 7:
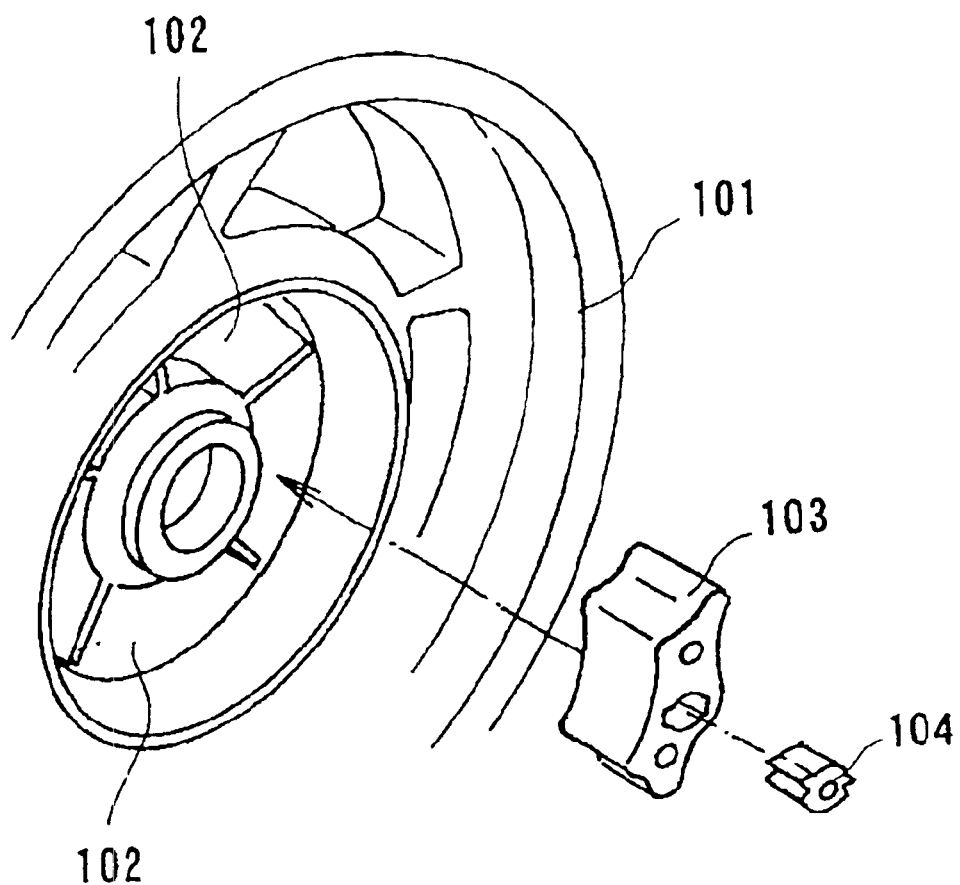
FIG. 7 is a perspective view of an essential part of a conventional power transmission mechanism.

The preferred embodiment of the present invention will now be described with reference to the accompanying drawings. FIG. 1 is a side view of a motorcycle employing a power transmission mechanism in accordance with the present invention. FIG. 2 is a plan view, partially in cross section, of a power transmission mechanism in accordance with the present invention. FIG. 3 is an enlarged cross-sectional view of an essential part of a power transmission mechanism in accordance with the present invention. FIG. 4 is an exploded perspective view of an essential part of a power transmission mechanism in accordance with the present invention. FIG. 5 is an illustration showing a relationship among a block for a wheel side flange, a wheel side receiving plate, and an elastic member.

A motorcycle 1 is provided with a front wheel 2, a rear wheel 3 which is a driving wheel, a handlebar 4 for steering the front wheel 2, a seat 5, a cowling 6 for covering the front side of a vehicle body, and a body cover 7 for covering the rear side of the vehicle body. The motorcycle 1 transmits the driving force of an engine to the rear wheel 3 via a power transmission mechanism 8 for a shaft driving system.

The power transmission mechanism 8 is mounted on the vehicle body such that it can freely oscillate and has a driving shaft 11 rotatably mounted in one of two rear forks 9, 10 for supporting the rear wheel 3. The driving shaft 11 is connected, at its top end, to the output shaft 13 of a transmission (not shown) via a universal coupling 12 and, at its rear end, to an input shaft 15 via an extension absorbing mechanism 14. A bevel gear 16 is integrally formed with the input shaft 15 and a bevel gear 18 which can rotate around a rear axle 17 is engaged with the bevel gear 16.

In addition, the rear axle 17 which is mounted between rear forks 9, 10 rotatably supports a wheel 19 and a driven flange 20 via ball bearings. The driven flange 20 is divided into an engine side flange 21 and a wheel side flange 22.

In the present preferred embodiment, the engine side flange 21 is a steel forging and the wheel side flange 22 is an aluminum alloy forging. However, it should be understood that the present invention is not limited to these forgings.

The engine side flange 21 is spline-fitted in a final gear 23 integrally rotating with the bevel gear 18. Furthermore, the wheel side flange 22 is provided with blocks 25 which are integrally fixed thereto at equal intervals, and the engine side flange 21 is fixed to the blocks 25 with bolts 26 through openings 24.

In addition, the wheel 19 has recesses 28, each of which is formed in the shape of a fan by partitions 27. As shown in FIG. 5, in the state where the driven flange 20 is assembled in the wheel 19, a damper rubber 29 which is compressed when power is transmitted is disposed in each recess between the block 25 and the partition 27, and a bump rubber 30 for preventing the block 25 from directly contacting the partition 27 when the wheel 19 is rotated in reverse is disposed between the block 25 and the opposite side partition 27.

Although the damper rubber 29 has the same shape as the bump rubber 30 in the preferred embodiment, the bump rubber 30 may be reduced in size with respect to the damper rubber 29.

In the constitution described above, the driving force of an engine is transmitted to the output shaft 13 of the transmission, the driving shaft 11, the extension absorbing mechanism 14, the input shaft 15, the bevel gears 16, 18, the final gear 23, and the driven flange 20 to rotate the driven flange 20. Furthermore, the rotating driven flange 20 compresses the damper rubbers 29 between the blocks 25 and the partitions 27 to transmit the power to the wheel 19.

With the above construction according to the present invention, even when abrupt variations in the rotation of the driving shaft or the wheel are produced, riding comfort not impaired. Furthermore, since the power is transmitted via the damper rubber 29 the variations in the rotation of the driving shaft or the wheel are not abrupt and therefore the force is less.

While the power transmission mechanism for a driving shaft system has been described in detail in the preferred embodiment, the present invention can also be applied to a power transmission mechanism for a chain driving system. In this case, from the viewpoint of molding and weight reduction, it is preferable that the engine side flange and the wheel side flange be made of aluminum alloy.

As described above, according to the power transmission mechanism in accordance with the present invention, the driven flange for transmitting the power from the engine to the wheel via the elastic member is divided into the engine side flange and the wheel side flange. Furthermore, the engine side flange is formed of a highly rigid material such as steel and the wheel side flange is formed of light material such as aluminum. Therefore, weight is decreased and versatility in use is increased, since this can respond to a damper rubber different in size.

Furthermore, the power transmission mechanism in accordance with the present invention does not have the metal collar into which a pin is inserted in the damper rubber. The damper rubber is compressed between the block fixed to the wheel side flange and the partition formed on the wheel. Therefore, this can eliminate contact between metals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission mechanism for a motorcycle, comprising:
    an elastic member fitted in a recess formed in a wheel of the motorcycle;
    a driven flange in contact with said elastic member for transmitting power from an engine of the motorcycle to the wheel via said elastic member, said driven flange being divided into an engine side flange formed of a highly rigid material and a wheel side flange formed of a lighter material than said highly rigid material; and
    a fastening member for integrally connecting said engine side flange to said wheel side flange.

2. The power transmission member according to claim 1, wherein said highly rigid material is steel and said lighter material is aluminum.

3. The power transmission mechanism according to claim 1, further comprising a final gear, wherein the power from the engine is transmitted to said final gear via a driving shaft and a bevel gear.

4. The power transmission mechanism according to claim 1, wherein the wheel of the motorcycle includes wheel side partitions, said driven flange including a plurality of blocks fixed to fastening members, and wherein a plurality of said elastic member are disposed between said plurality of blocks and said wheel side receiving plates.

5. The power transmission mechanism according to claim 4, wherein said plurality of blocks are supported on a wheel side of said wheel side flange.

6. The power transmission mechanism according to claim 4, wherein said plurality of blocks are disposed between respective pairs of said plurality of elastic members.

7. A motorcycle, comprising:
    an engine for transmitting power;
    a wheel having a recess formed therein; and
    a power transmission mechanism, said power transmission mechanism including:
        an elastic member fitted in said recess formed in said wheel;
        a driven flange in contact with said elastic member for transmitting the power from the engine to the wheel via said elastic member, said driven flange being divided into an engine side flange formed of a highly rigid material and a wheel side flange formed of a lighter material than said highly rigid material; and
        a fastening member for integrally connecting said engine side flange to said wheel side flange.

8. The motorcycle according to claim 7, wherein said highly rigid material is steel and said lighter material is aluminum.

9. The motorcycle according to claim 7, further comprising a final gear, wherein the power from said engine is transmitted to said final gear via a driving shaft and a bevel gear.

10. The motorcycle according to claim 7, wherein said wheel includes wheel side partitions, said driven flange including a plurality of blocks fixed to fastening members, and wherein a plurality of said elastic member are disposed between said plurality of blocks and said wheel side receiving plates.

11. The motorcycle according to claim 10, wherein said plurality of blocks are supported on a wheel side of said wheel side flange.

12. The motorcycle according to claim 10, wherein said plurality of blocks are disposed between respective pairs of said plurality of elastic members.

13. A power transmission mechanism for a motorcycle, said motorcycle including a wheel having a plurality of recesses formed therein, said recesses being separated by a plurality of partitions, said power transmission comprising:

a plurality of elastic members, a pair of said elastic members being fitted in each of said plurality of recesses; and a driven flange in contact with said plurality of elastic members for transmitting power from an engine of the motorcycle to the wheel via said plurality of elastic members, said driven flange including a plurality of blocks fixed to fastening members, one said plurality of blocks being disposed between each pair of elastic members;

wherein said driven flange is divided into an engine side flange formed of a highly rigid material and a wheel side flange formed of a lighter material than said highly rigid material, and said fastening members are provided for integrally connecting said engine side flange to said wheel side flange.

14. The power transmission member according to claim 13, wherein said highly rigid material is steel and said lighter material is aluminum.

15. The power transmission mechanism according to claim 13, further comprising a final gear, wherein the power from the engine is transmitted to said final gear via a driving shaft and a bevel gear.

16. The power transmission mechanism according to claim 13, wherein said plurality of blocks are supported on a wheel side of said wheel side flange.

* * * * *